US012190855B2

(12) United States Patent
Ku

(10) Patent No.: US 12,190,855 B2
(45) Date of Patent: Jan. 7, 2025

(54) ACTIVE NOISE REDUCTION WITH IMPULSE DETECTION AND SUPPRESSION

(71) Applicant: Bose Corporation, Framingham, MA (US)

(72) Inventor: Emery M. Ku, Somerville, MA (US)

(73) Assignee: Bose Corporation, Framingham, MA (US)

(*) Notice: Subject to any disclaimer, the term of this patent is extended or adjusted under 35 U.S.C. 154(b) by 192 days.

(21) Appl. No.: 17/929,919

(22) Filed: Sep. 6, 2022

(65) Prior Publication Data

US 2024/0078995 A1 Mar. 7, 2024

(51) Int. Cl.

| | |
|---|---|
| ***G10K 11/16*** | (2006.01) |
| ***G10K 11/178*** | (2006.01) |
| ***H04R 1/10*** | (2006.01) |

(52) U.S. Cl.

CPC .. *G10K 11/17854* (2018.01); *G10K 11/17823* (2018.01); *G10K 11/17827* (2018.01); *G10K 11/1783* (2018.01); *G10K 11/17881* (2018.01); *H04R 1/1083* (2013.01); *G10K 11/17825* (2018.01); *G10K 2210/1081* (2013.01); *G10K 2210/3023* (2013.01); *G10K 2210/3026* (2013.01); *G10K 2210/3027* (2013.01); *G10K 2210/3028* (2013.01); *H04R 2460/01* (2013.01)

(58) Field of Classification Search

CPC ......... G10K 11/17854; G10K 11/1783; G10K 11/17823; G10K 11/17881; G10K 11/17827; G10K 11/17825; G10K 2210/1081; G10K 2210/3023; G10K 2210/3026; G10K 2210/3027; G10K 2210/3028; H04R 1/1083; H04R 2460/01

USPC ............................................... 381/71.5, 71.1

See application file for complete search history.

(56) References Cited

U.S. PATENT DOCUMENTS

| | | | |
|---|---|---|---|
| 8,073,150 | B2 | 12/2011 | Joho et al. |
| 8,073,151 | B2 | 12/2011 | Joho et al. |
| 9,082,388 | B2 | 7/2015 | Annunziato et al. |
| 10,553,195 | B2 | 2/2020 | O'Connell et al. |
| 11,087,776 | B2 | 8/2021 | Rule et al. |

(Continued)

OTHER PUBLICATIONS

International Search Report and the Written Opinion of the International Searching Authority, International Application No. PCT/US2023/032063, dated Dec. 21, 2023, pp. 1-8.

*Primary Examiner* — Ammar T Hamid

(74) *Attorney, Agent, or Firm* — Bond, Schoeneck & King, PLLC

(57) ABSTRACT

An apparatus includes a noise reduction headphone comprising one or more microphones and an acoustic transducer, the one or more microphones configured to generate an input signal; and a controller comprising one or more processing devices, the controller configured to: process the input signal through one or more noise reduction filters to generate a noise-reduction signal, compare the input signal to an estimate of ambient noise to determine if the energy of the input signal is greater than the estimate of ambient noise, wherein if the energy of the input signal is greater than the estimate of ambient noise by a predetermined amount, a change in the noise reduction signal is suppressed; and generate an output signal, the output signal comprising, at least in part, the noise-reduction signal, wherein the acoustic transducer is configured to produce an acoustic output in accordance with the output signal.

23 Claims, 11 Drawing Sheets

(56) References Cited

U.S. PATENT DOCUMENTS

| | | | | |
|---|---|---|---|---|
| 2018/0369689 | A1* | 12/2018 | Murata | A63F 13/235 |
| 2019/0130928 | A1* | 5/2019 | Rule | G10K 11/17885 |
| 2022/0189451 | A1 | 6/2022 | Rui et al. | |

* cited by examiner

ACTIVE NOISE REDUCTION WITH IMPULSE DETECTION AND SUPPRESSION

BACKGROUND

This disclosure generally relates to acoustic devices such as headphones that can include active noise reduction (ANR) capabilities blocking at least portions of ambient noise from reaching the ear of a user, and specifically to acoustic devices with ANR capabilities that detect suppress an ANR response to impulsive sounds.

SUMMARY

Two or more of the features described in this disclosure, including those described in this summary section, may be combined to form implementations not specifically described herein.

According to an aspect, an apparatus includes a noise reduction headphone comprising one or more microphones and an acoustic transducer, the one or more microphones configured to generate an input signal based on captured ambient sounds; and a controller comprising one or more processing devices, the controller configured to: process the input signal through one or more noise reduction filters to generate a noise-reduction signal, wherein the noise-reduction signal is configured to reduce an effect of the input signal; compare the input signal to an estimate of ambient noise to determine if an energy of the input signal is greater than the estimate of ambient noise, wherein if the energy of the input signal is greater than the estimate of ambient noise by a predetermined amount, a change in the noise-reduction signal is suppressed; and generate an output signal, the output signal comprising, at least in part, the noise-reduction signal, wherein the acoustic transducer is configured to produce an acoustic output in accordance with the output signal.

In an example, the output signal is a weighted combination of the noise-reduction signal and a pass-through signal.

In an example, comparing the input signal to an estimate of ambient noise comprises comparing an energy of the input signal to an ambient noise signal produced by a first low pass filter, wherein the first low pass filter is configured such that the ambient noise signal is an estimate of the ambient noise present in the captured ambient sounds.

In an example, the ambient noise signal is delayed in time with respect to the input signal.

In an example, the energy of the input signal is determined by the output of a second low pass filter, wherein the second low pass filter affects greater smoothing on the input signal than the first low pass filter.

In an example, comparing the energy of the input signal further comprises determining whether a difference between the output of the second low pass filter and the ambient noise signal satisfies a threshold condition.

In an example, comparing the energy of the input signal further comprises determining whether a ratio between the output of the second low pass filter and the ambient noise signal satisfies a threshold condition.

In an example, suppressing the noise reduction signal comprises temporarily ceasing to increase a magnitude of the noise reduction signal.

In an example, temporarily ceasing to increase a magnitude of the noise reduction signal comprises temporarily ceasing to adjust a variable gain filter in a pass-through processing chain generating a pass-through signal, wherein the output signal is a weighted combination of the noise-reduction signal and the pass-through signal.

In an example, suppressing the noise reduction signal comprises adjusting a rate at which the noise reduction signal is adjusted in response to the input signal.

According to another aspect, one or more non-transitory machine-readable storage devices having encoded thereon computer readable instructions for causing one or more processing devices to perform a method includes the steps: receiving an input signal from one or more microphones, the input signal being based on captured ambient sounds; processing the input signal through one or more noise reduction filters to generate a noise-reduction signal, wherein the noise-reduction signal is configured to reduce an effect of the input signal; comparing the input signal to an estimate of ambient noise to determine if an energy of the input signal is greater than the estimate of ambient noise, wherein if the energy of the input signal is greater than the estimate of ambient noise by a predetermined amount, suppressing a change in the noise reduction signal; and generating an output signal to an acoustic transducer, the output signal comprising, at least in part, the noise-reduction signal, such that the acoustic transducer produces an acoustic output in accordance with the output signal.

In an example, the output signal is a weighted combination of the noise-reduction signal and a pass-through signal.

In an example, comparing the input signal to an estimate of ambient noise comprises comparing an energy of the input signal to an ambient noise signal produced by a first low pass filter, wherein the first low pass filter is configured such that the ambient noise signal is an estimate of the ambient noise present in the captured ambient sounds.

In an example, the ambient noise signal is delayed in time with respect to the input signal.

In an example, the energy of the input signal is determined by the output of a second low pass filter, wherein the second low pass filter affects greater smoothing on the input signal than the first low pass filter.

In an example, comparing the energy of the input signal further comprises determining whether a difference between the output of the second low pass filter and the ambient noise signal satisfies a threshold condition.

In an example, comparing the energy of the input signal further comprises determining whether a ratio between the output of the second low pass filter and the ambient noise signal satisfies a threshold condition.

In an example, suppressing the noise reduction signal comprises temporarily ceasing to increase a magnitude of the noise reduction signal.

The one or more non-transitory machine-readable storage devices of claim 18, wherein temporarily ceasing to increase a magnitude of the noise reduction signal comprises temporarily ceasing to adjust a variable gain filter in a pass-through processing chain generating a pass-through signal, wherein the output signal is a weighted combination of the noise-reduction signal and the pass-through signal.

The one or more non-transitory machine-readable storage devices of claim 11, wherein suppressing the noise reduction signal comprises adjusting a rate at which the noise reduction signal is adjusted in response to the input signal.

According to another aspect, a method includes the steps of receiving an input signal representing audio captured by a microphone of an active noise reduction (ANR) headphone; processing, by one or more processing devices, a portion of the input signal to determine a noise level in the input signal; determining that the noise level satisfies a first threshold condition; comparing the input signal to an estimate of ambient noise to determine if an energy of the input signal is greater than that of the estimate of ambient noise by a predetermined amount, responsive to determining that the noise level satisfies the first threshold condition and that the energy of the input signal is not greater than that of the estimate of the ambient noise by the predetermined amount, generating an output signal in which ANR processing on the input signal is automatically controlled to limit a loudness level of the output signal; responsive to determining that the energy of the input signal is greater than the estimate of the ambient noise by the predetermined amount, generating an output signal in which ANR processing on the input signal is not automatically controlled to limit the loudness level of the output signal; and driving an acoustic transducer of the ANR headphone using the output signal.

In an example, the step of generating an output signal in which ANR processing on the input signal is automatically controlled to limit a loudness level of the output signal comprises: generating an output signal in which ANR processing on the input signal is automatically controlled to limit the loudness level of the output signal to a level lower than or substantially equal to a predefined target loudness level of the output signal.

In an example, the predefined target loudness level is a sound pressure level at an ear of a user of the ANR headphone.

The details of one or more implementations are set forth in the accompanying drawings and the description below. Other features, objects, and advantages will be apparent from the description and drawings, and from the claims.

DETAILED DESCRIPTION

Figure 1:
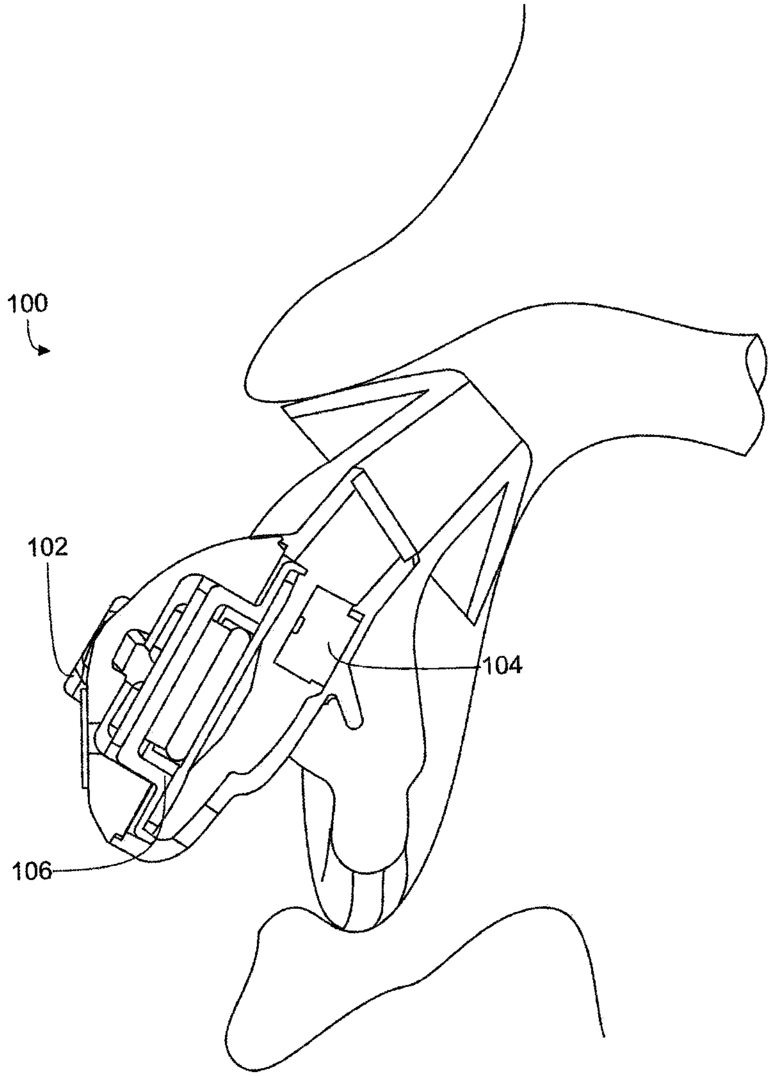
FIG. 1 shows an example of an in-the-ear active noise reduction (ANR) headphone.

This disclosure relates to the use of Active Noise Reduction (ANR) in acoustic devices while concurrently allowing a user to be aware of ambient sounds up to a threshold amount and suppressing the ANR response to rapid transient sounds (also referred to herein as impulses).

The technology described herein, in some examples, allows for the implementation of an ANR signal flow path in parallel with a variable hear-through or pass-through signal flow path, wherein the gain of the pass-through signal path is controllable or adjustable based on threshold conditions on ambient noise. For example, a device implementing the technology can be configured to pass ambient sounds up to a threshold level (possibly with some ANR processing in parallel), but enable or ramp up the ANR processing when the magnitude of the ambient sound exceeds the threshold. In some cases, this may improve the overall user experience, for example, by helping a user avoid excessive acoustic isolation in low noise environments, while still providing ANR functionalities when the noise exceeds a threshold.

In addition, the technology described herein can suppress the ANR response to rapid transient sounds. Noises such as clapping, clinking silverware, clicks from closing case lids, coughing, closing doors, etc., can all be characterized as these sorts of impulses. Any ANR response to an impulse will almost necessarily be slower than the impulse that triggers it, meaning that the user will hear both the impulse and then a delayed, brief, noise reduction, which can be noticeable and distracting. To avoid this sort of behavior, the ANR response to impulses can be suppressed by comparing an input signal (e.g., from feedforward microphones) to an estimate of the ambient noise to determine whether a rapid increase in signal energy has occurred. If such an increase has occurred, it can be determined than the ANR processing can be suppressed (e.g., temporarily frozen), such that an unwanted to ANR response to the impulse does not occur.

By way of background, Active Noise Reduction (ANR) devices such as ANR headphones are used for providing potentially immersive listening experiences by reducing effects of ambient noise and sounds. However, by blocking out the effect of the ambient noise, an ANR device may create an acoustic isolation from the environment, which may not be desirable in some conditions. For example, a user waiting at an airport may want to be aware of flight announcements while using ANR headphones. In another example, while using an ANR headphone to cancel out the noise of an airplane in flight, a user may wish to be able to communicate with a flight attendant without having to take off the headphone.

Further, some headphones offer a feature commonly called "talk-through" or "monitor," in which external microphones are used to detect external sounds that the user might want to hear. For example, the external microphones, upon detecting sounds in the voice-band or some other frequency band of interest, can allow signals in the corresponding frequency bands to be piped through the headphones. Some other headphones allow multi-mode operations, wherein in a "hear-through" mode, the ANR functionality may be switched off or at least reduced, over at least a range of frequencies, to allow relatively wide-band ambient sounds to reach the user. However, in some cases, a user may want to be aware of ambient sounds up to a threshold, and want ANR processing to kick in only when the ambient sound exceeds the threshold. In addition, the user may want to have a degree of control on the amount of ambient sounds that pass through the ANR device.

An active noise reduction (ANR) device can include a configurable digital signal processor (DSP), which can be used for implementing various signal flow topologies and filter configurations. Examples of such DSPs are described in U.S. Pat. Nos. 8,073,150 and 8,073,151, which are incorporated herein by reference in their entirety. U.S. Pat. No. 9,082,388, also incorporated herein by reference in its entirety, describes an acoustic implementation of an in-ear active noise reducing (ANR) headphone, as shown in FIG. 1. This headphone 100 includes a feedforward microphone 102, a feedback microphone 104, an output transducer 106 (which may also be referred to as an electroacoustic transducer or acoustic transducer), and a noise reduction circuit (not shown) coupled to both microphones and the output transducer to provide anti-noise signals to the output transducer based on the signals detected at both microphones. An additional input (not shown in FIG. 1) to the circuit provides additional audio signals, such as music or communication signals, for playback over the output transducer 106 independently of the noise reduction signals. The additional input may be a wired or wireless (e.g., Bluetooth) connection to an audio source.

The term headphone, which is interchangeably used herein with the term headset, includes various types of personal acoustic devices such as in-ear, around-ear or over-the-ear headsets, earphones, and hearing aids. The headsets or headphones can include an earbud or ear cup for each ear. The earbuds or ear cups may be physically tethered to each other, for example, by a cord, an over-the-head bridge or headband, or a behind-the-head retaining structure. In some implementations, the earbuds or ear cups of a headphone may be connected to one another via a wireless link.

Figure 2:
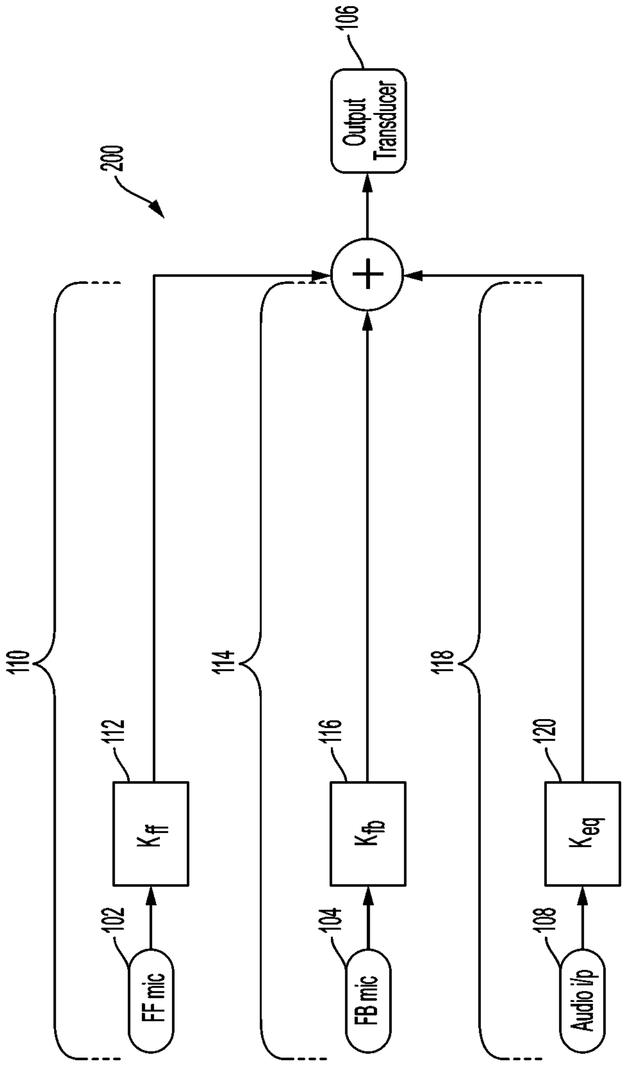
FIG. 2 is a block diagram of an example configuration in of an ANR device.

Various signal flow topologies can be implemented in an ANR device to enable functionalities such as audio equalization, feedback noise cancellation, feedforward noise cancellation, etc. For example, as shown in the example block diagram of an ANR device 200 in FIG. 2, the signal flow topologies can include a feedforward signal flow path 110 that drives the output transducer 106 to generate an anti-noise signal (using, for example, a feedforward compensator 112) to reduce the effects of a noise signal picked up by the feedforward microphone 102. In another example, the signal flow topologies can include a feedback signal flow path 114 that drives the output transducer 106 to generate an anti-noise signal (using, for example, a feedback compensator 116) to reduce the effects of a noise signal picked up by the feedback microphone 104. The signal flow topologies can also include an audio path 118 that includes circuitry (e.g., equalizer 120) for processing input audio signals 108 such as music or communication signals, for playback over the output transducer 106. In some implementations, the feedforward compensator 112 can include an ANR signal flow path disposed in parallel with a pass-through path. Examples of such configurations are described in U.S. Pat. No. 10,096,313, the entire content of which is incorporated herein by reference.

In some implementations, the output of the output transducer 106 may be adjusted in accordance with a desired final volume or loudness at the ear, such that the amount of overall attenuation (e.g., obtained by controlling one or both of the ANR and pass-through signal paths) provided by the ANR device rises and falls as the surrounding noise level rises and falls, respectively. For example, when the ambient sound level does not satisfy a threshold condition (e.g., is below a threshold level), the ambient sound may be allowed to pass through to the ear with little or no attenuation. On the other hand, when the ambient sound level does satisfy the threshold condition (e.g., breaches the threshold level), the ambient sound may be attenuated, possibly progressively (i.e., with more attenuation as the environment gets louder).

Figure 3A:
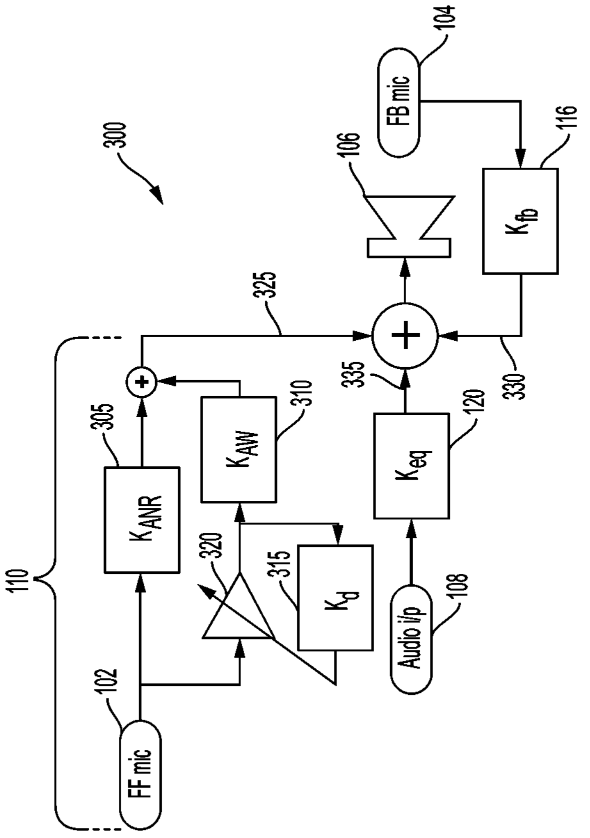
FIG. 3A is a block diagram of an example implementation of an ANR device where a variable pass-through path is disposed in parallel to an ANR path in a feedforward signal flow path.

FIG. 3A is a block diagram of an example implementation of an ANR device 300 where a variable pass-through path is disposed in parallel to an ANR path in a feedforward signal flow path to provide the variable attenuation described above. Specifically, the device 300 includes an ANR filter 305 (also denoted as KANR) disposed in parallel to a combination of a pass-through filter 310 (also denoted as KAW) and a detector filter 315 (also denoted and referred to as a sidechain filter Kd). The detector filter 315 may be used to monitor signals captured using the FF microphone 102, and control an input to the pass-through filter (e.g., using a variable gain amplifier (VGA) or compressor 320). In some implementations, the input to the detector filter 315 can be pre-processed, for example, to make the detector filter 315 more sensitive to certain types of signal. For example, the sidechain filter can be configured to make the detector filter more sensitive to perceptually-weighted speech-band noise level changes. The output of the detector filter 315 can be used to adjust the VGA 320 which applies a gain to the input signal provided to the pass-through filter 310.

In some implementations, the detector filter 315 can include a frequency weighting filter (e.g., an A-weighting filter and/or a filter representing a head-related transfer function (HRTF)). The detector filter 315 can also include a level generator that converts the output of the frequency-weighting filter to a signal level, which is then compared to a threshold level (e.g., a user-defined or predetermined level). The detector filter 315 can also include a signal generator configured to generate a control signal that controls the gain of the VGA 320. In some implementations, the signal generator can be configured to generate the control signal in accordance with target attack and decay rate dynamics. An 'attack rate' is defined as the rate at which attenuation is increased. In some implementations, the target attack rate is less than 100 dB (in overall insertion gain) per second, such as approximately 10 dB/sec. A 'decay rate' or 'release rate' is defined as the rate at which attenuation is decreased. In some implementations, the decay rate is faster than the attack rate by a factor of two or more. In some implementations, a combination of a low threshold (e.g. <80 dBA of insertion gain) and a low attack rate (e.g., <100 dB/sec) can be used for a comfortable user experience in various scenarios of day-to-day life.

In some implementations, the detector filter 315 can be configured to control the VGA or compressor 320 in accordance with a threshold condition. The threshold condition can be preset, or set in accordance with a user-input. In some implementations, if the detector filter 315 determines the ambient noise level to be below a particular threshold, the output of the detector filter 315 controls the compressor or VGA 320 such that the gain of the pass-through signal flow path is substantially equal to unity. This in turn allows a user to hear ambient sounds substantially with little or no attenuation. In some implementations, if the detector filter determines the ambient noise level to be at or above the threshold, the output of the filter 315 can be configured to control the compressor or VGA 320 such that the overall gain of the pass-through signal path is less than unity, and the output of the ANR filter 305 provides attenuation of the noise at the ear. This allows the user to be aware of the environmental noise and sounds when the noise is below the threshold, yet take advantage of the ANR functionalities of the headset when the noise breaches a threshold—for example, to keep loud sounds such as from vehicles or sirens or machinery from getting uncomfortably loud.

While the example of FIG. 3A shows a VGA disposed in the pass-through signal path only, other variations are also possible. For example, a VGA may be disposed in the ANR path either in addition to or instead of the VGA 320 disposed in the pass-through signal path. In some implementations, a VGA disposed in a signal path (e.g., the ANR path or the pass-through path) can be controlled to adjust a weight associated with the corresponding path. For example, a VGA gain may be set substantially equal to zero to make the weight associated with the corresponding path substantially equal to zero. In some implementations, one or more additional parameters associated with a VGA (or the corresponding path in general) may be adjusted to control one or more characteristics of the corresponding path. For example, a response rate for the VGAs (which may also be referred to as compressor attack and release times corresponding to whether the compression is being ramped up or down, respectively) may be adjusted to provide either a rapid response or a relatively gradual response to changing noise level. In some implementations, this may dictate how quickly the ANR device adjusts the gains when the noise level satisfies the threshold condition, and/or how quickly the ANR device reduces or restores the gain to a predetermined level (e.g. unity) when the noise level no longer satisfies the threshold condition. In some implementations, the response rate can be adjusted such that the ANR processing responds to an increase in noise level smoothly based on a target attack rate. In some implementations, the target attack rate can be less than 100 dB/sec.

In some implementations, the outputs of the ANR path and the pass-through path are combined (e.g., in a weighted combination) to generate a feedforward signal 325 that drives, at least in part, the acoustic transducer 106. In some implementations, the feedforward signal 325 may be combined with a feedback signal 330 and/or one or more other signals 335. The signals 335 can include, for example, media signals originating from an audio input 108 or signals from one or more other microphones or audio sources.

Figure 3B:
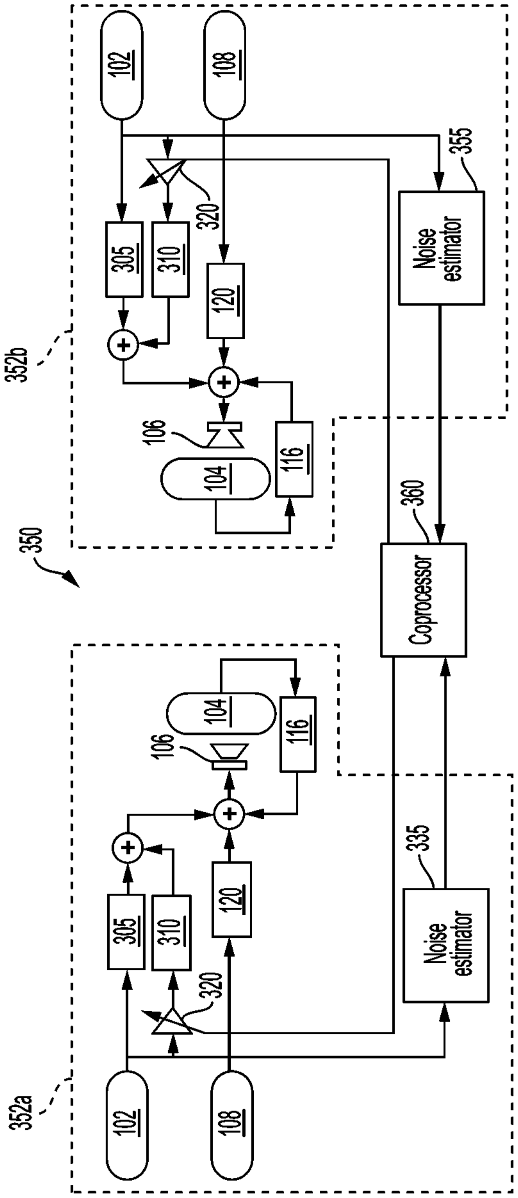
FIG. 3B is a block diagram of an example implementation of a binaural ANR system where a variable gain of the pass-through path disposed in parallel to the ANR path for each ear is controlled by a coprocessor based on estimates of noise-levels at both ears.

In some implementations, the gain control of the VGA or compressor 320 in each of the two separate earbuds or earcups can be coordinated, for example, to avoid having substantially unequal noise reduction in two earbuds/earcups of a headphone. FIG. 3B is a block diagram of an example implementation of such a binaural ANR system 350 where a variable gain of the pass-through path disposed in parallel to the ANR path for each ear is controlled based on estimates of noise-levels at both ears. Specifically, the implementation shown in FIG. 3B includes a coprocessor 360, which receives inputs from noise estimator modules 355 disposed in each of the two earbuds or earcups 352*a* and 352*b* (352, in general), and coordinates the gain control of the corresponding VGAs or compressors 320 in the two earbuds or earcups 352. In some implementations, the coprocessor 360 is disposed in one of the earbuds or earcups 352. In some implementations, the coprocessor 360 can be disposed in a device external to the headphone, such as in a device that is the source of the acoustic media being played through the headphone. The coprocessor can include one or more processing devices configured to analyze inputs received from the noise estimators 355, and generate gain control signals for the VGAs 320.

In some implementations, the noise estimator 355 comprises one or more digital filters configured to generate a signal that provides an estimate of the noise at the location of the corresponding earbud or earcup 352. For example, the noise estimator 355 can include a front-end weighting filter that emphasizes the portion of the spectrum most indicative on how loud a sound is perceived. In some implementations, the front-end weighting filter's response approximates A-weighting divided by a head-related transfer function (HRTF) (or another function representing the effect due to the presence/orientation of a user's head) to refer the noise signal as measured at the headphone's at-ear microphones to the diffuse field. Other front-end weighting filters are possible such as B- or C-weighting or a more sophisticated loudness model could be used. In some implementations, the front-end weighting filter can be used to compensate for hardware effects (e.g., microphone sensitivity). In some implementations, the front-end weighting filter can include multiple cascaded filters each of which accounts/compensates for a separate effect (e.g., an effect due to the presence/orientation of the head, an effect due to hardware, and/or A-weighting). The output of the weighting filter can be an AC signal that represents the relative loudness perceived at the corresponding ear. Such output can then be post-processed (e.g., by rectification and then low pass filtering) before being provided to the coprocessor 360 as an estimate of the noise-level at the corresponding ear.

Figure 3C:
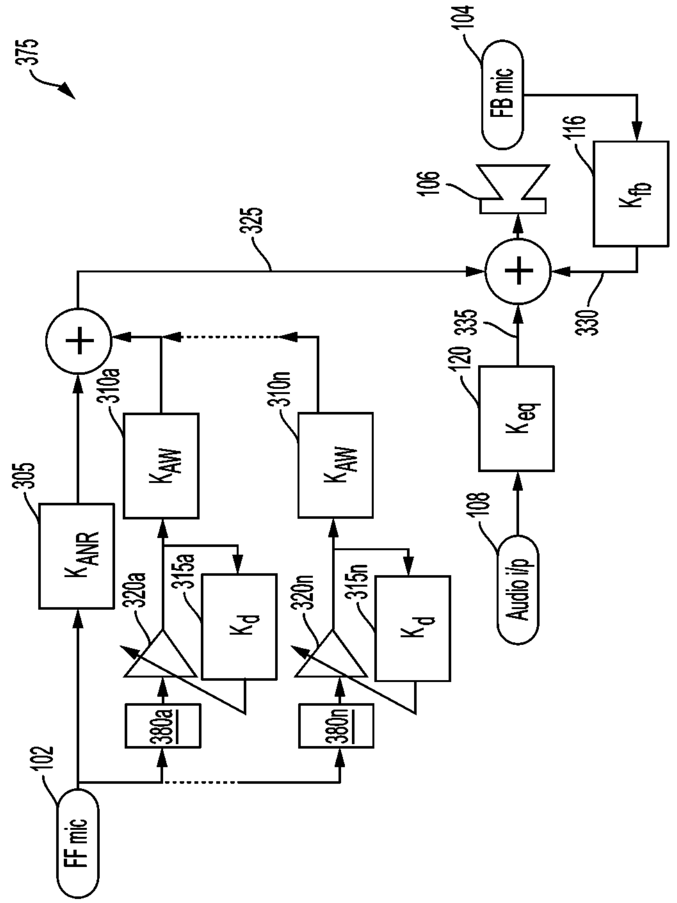
FIG. 3C is a block diagram of an example implementation of an ANR device where multiple variable pass-through paths are disposed in parallel to an ANR path in a feedforward signal flow path.

In some implementations, the systems depicted in FIGS. 3A and 3B can be implemented as a part of a multi-band system with two or more parallel paths, each with its own VGA 320 and pass-through filter KAW 310, all disposed in parallel to KANR 305. An example of such a device is depicted in FIG. 3C, which shows a multi-band version of the device of FIG. 3A. Specifically, FIG. 3C is a block diagram of an example implementation of an ANR device 375 where multiple variable pass-through paths are disposed in parallel to an ANR path in a feedforward signal flow path. Each path includes a corresponding pass-through filter (one of: 310 *a*, . . . , and 310 *n*, 310 in general), a corresponding detector filter (one of: 315 *a*, . . . , and 315 *n*, 315 in general), and a corresponding VGA (one of: 320 *a*, . . . , and 320 *n*, 320 in general). Each pass-through filter 310 passes a different portion of the desired pass-through spectrum (as filtered using a corresponding bandpass filter-one of: 380 *a*, . . . , and 380 *n*) such that, when all VGAs 320 have unity gain, the overall desired 'aware' response is achieved. In some implementations, various parameters of the different parallel paths can be configured separately. For example, a particular parallel path can be configured to have its own attack and release rate, compression ratio, and/or threshold that is appropriate for the corresponding frequency band. In some implementations, one or more parameters, e.g., the thresholds and compression ratios, can be common across multiple parallel paths, while the corresponding attack and release rates can be different. This can allow for frequency-specific tuning of the response of the ANR device. For example, a device can be configured to have a fast response to high-frequency noise spikes, but a relatively slower response to low frequency noise. In some implementations, the parameters of the different paths can be made user-adjustable.

In some implementations, the components of the feedforward signal path 110 may be adjusted in various ways to generate the feedforward signal 325. Such methods of adjusting these and plots illustrating some example variations in the ANR processing in the feedforward signal path 110 based on different threshold conditions are shown in U.S. Pat. No. 11,087,776 which is hereby incorporated by reference in its entirety.

In certain examples, the response of the ANR path can be briefly suppressed to avoid responding to detected impulses (i.e., rapid transient signals characterized by a sharp increase in noise and a corresponding sharp decrease, typically within 1-2 ms). To suppress an ANR response to an impulse, it is necessary to first discriminate between an impulse and ambient noise (i.e., noise that should ideally be filtered out, such as the low frequency hum of airplane noise or the sound of a passing motorcycle). To accomplish this, detector filter 315 can be further configured to compare the energy in each sample (i.e., the sample under test) against an estimated energy of the ambient noise. The ambient noise can be estimated by characterizing the energy in neighboring samples. If the energy in the sample under test is larger than the energy in the neighboring samples by some predetermined amount, it can be concluded that a large spike in energy, which is indicative of an impulse, has occurred. Of course, it is possible that an impulse could occur that was not larger than the ambient noise, but, in these instances, the impulse will likely not be perceivable over the ambient noise and should not interfere with the ANR gain. (Although described in connection with detector filter 315, it should be understood that the impulse detection can be performed in any suitable location within the topology.)

The energy in neighboring samples can be estimated in a variety of ways. In one example, a buffer of samples can be stored and the values of each averaged. The buffer of samples can comprise samples before the sample under test, after the sample under test, or both. In either case, it is typically useful, although not necessary, to exclude the sample under test itself from the average, since it will tend to skew the average value against the sample under test is measured. In an alternative example, rather than employing a buffer of samples, an exponential moving average can employed to average the current sample with a weighted average of previous examples.

In alternative example, rather than operating in the time domain, the input signal could be transformed into the frequency domain (e.g., through a DFT or other suitable frequency transformation). An ambient noise estimation can be determined from examining the average power in the resulting frequency, or the average power in a subset of frequency bins that are of interest. This average power can be updated (e.g., through an exponential moving average) for each successive frame of frequency bins (i.e., for each new sample) or can calculated for each frame independently. Any given bin or set of bins that exceeds the calculated ambient noise can be flagged as an impulse. These methods, however, are comparatively memory intensive and computationally expensive.

Figure 4A:
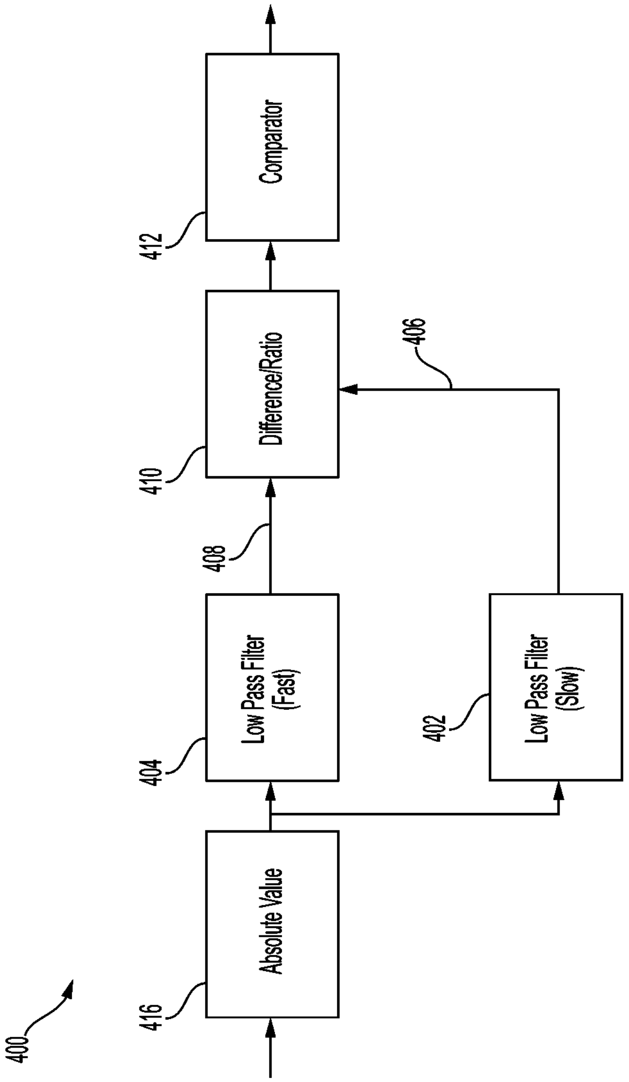
FIG. 4A is a block diagram of an example implementation of an impulse detector.

In an alternative example, shown in FIG. 4A, two low pass filters can be employed in parallel paths. The low pass filters of the two paths can work to smooth the input signal at different rates. For example, low pass filter 402 can apply greater smoothing to the input signal than low pass filter 404, resulting in a signal that will represent an estimate of ambient noise. (The output of this low pass filter 402, in this example, is thus referred to as ambient noise signal 406.) More specifically, the output of low pass filter 404, in some examples, can be tailored, similar to an exponential moving average, to provide an approximate average value of samples in a sliding window. Further, in various examples, low pass filter 402 output can be scaled and/or have other processing performed on it to tailor it to suitably represent the ambient noise. In these examples, the ambient noise signal 406 is the cumulative output of the processing performed to estimate the ambient noise, not simply the output of low pass filter 402. The output of low pass filter 404, by contrast, can apply relatively fast smoothing, operating as an envelope detector to characterize the peak values of the input signal. This filter functions to extend the impulse so that an estimate of the peak is easier to capture and compare to the ambient noise estimate. The output of this filter 404 is referred to as detection signal 408. Detection signal 408 can likewise be the result of additional processing to characterize the energy of the sample under test in manner conducive for detecting an impulse. Further, in certain examples, low pass filter 404 can be omitted and the input signal relied upon directly for comparison with ambient noise signal 406. For the purposes of this disclosure, an example where low pass filter 404 is omitted, the input signal becomes the detection signal 408.

In general, any suitable low pass filter can be used for low pass filter 402 and low pass filter 404. Further, to implement the different smoothing characteristics of low pass filters 402 and 404, a different cutoff frequency can be selected for each. For example, the cut off frequency of low pass filter 402 can be set to 5 Hz, while the cut off frequency of low pass filter 404 can be set to 100 Hz, although other suitable cut off frequencies could be used. In various examples, the input signal can alternatively be filtered with an FIR Hilbert transform or with whitening filters, which aid in removing any spectral shape of the ambient noise to result in more robust impulse detection (although these examples may require more processing power than typically available).

Since ambient noise signal 406 represents an estimate of ambient noise, the presence of an impulse can be detected by comparing detection signal 408 to ambient noise signal 406. The comparison of the detection signal 408 to ambient noise signal 406 can be accomplished in one of a variety of ways. In one example, the difference between detection signal 408 and ambient noise signal 406 can be found by difference module 410, the output of which is input to a comparator 412 for comparing the difference between the signals to a threshold value. If the difference between the signals is greater than the threshold, the input signal can be flagged as likely containing an impulse, or, at the very least, the start of a new sustained noise. In an alternative example, rather than finding the difference between the detection signal 408 and ambient noise signal 406, a ratio of the two signals can be found and compared to a threshold to determine if the ratio of the two signals is indicative of an impulse. (This method is akin to comparing a signal-to-noise ratio of the two signals to a threshold.) Other suitable methods of comparing the detection signal 408 to the ambient noise signal 406 that give some indication of how much larger the detection signal 408 is to the ambient noise signal 406 are contemplated herein.

Figure 4B:
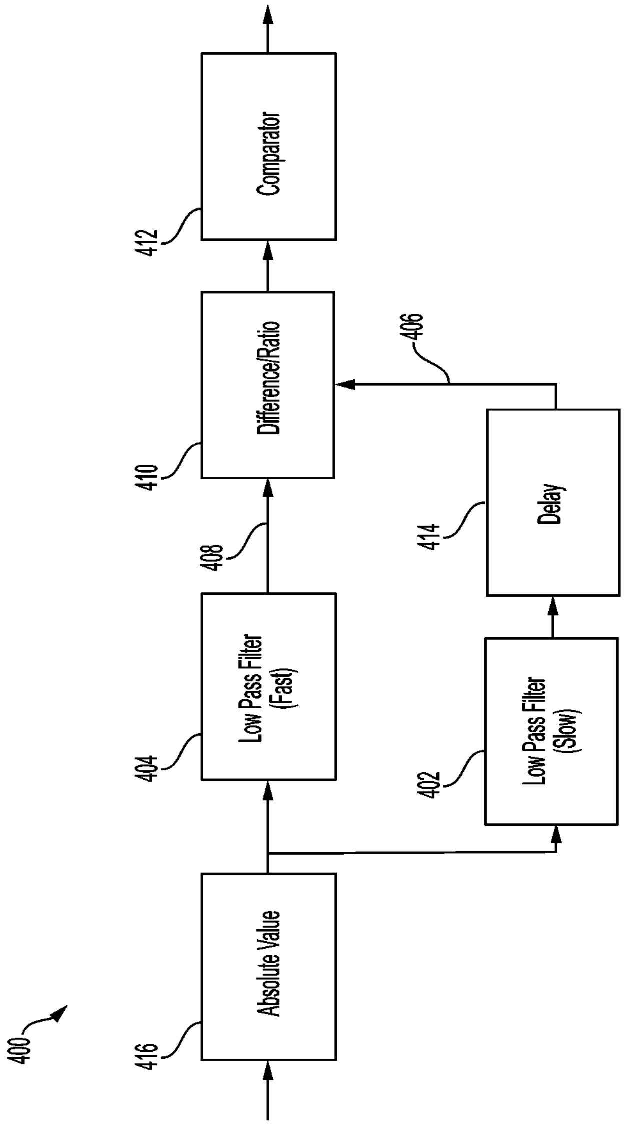
FIG. 4B is a block diagram of an example implementation of an impulse detector.

In the example shown in FIG. 4B, to better represent the ambient noise, the output of low pass filter 402 can be delayed, using delay 414, a predetermined amount (e.g., 2 ms) to prevent the sample under test from affecting the ambient noise signal 406 against which it is compared. Stated differently, by applying a delay, the ambient noise signal represents the ambient noise as it exists prior to the current sample, and thus better represents the ambient noise against which the signal should be compared. Typically, such a delay is useful to capture all but very fast energy impulses, which could be captured without it.

Further, as shown in FIGS. 4A and 4B, the input signal, as applied to low pass filter 402 and low pass filter 404, can be an absolute value (e.g., rectified version) of the feedforward microphone(s) 102 output. This is to prevent the naturally oscillating audio signals from detracting from the average value of the ambient noise and to ensure that the detection signal 408 and the ambient noise signal 406 the same sign when being compared. Further, it should be understood that additional processing (e.g., a high pass filter) can be performed on the input signal before it is received at low pass filters 402 and 404 so that impulses can be detected more reliably, or for any other suitable reason.

In response to the output of comparator 412 indicating the likely presence of an impulse, the ANR response that would have resulted from the feedforward microphone output sample containing the detected impulse, can be suppressed. If, however, comparator 412 output does not indicate the likely presence of an impulse, the output of ANR is not suppressed and will, instead, follow the parameters of the system to apply ANR according to a threshold condition or some other metric, as described above. If the flagged sample is not an impulse but, rather, the start of a new sustained noise (e.g., an approaching motorcycle), the initial sample containing the new sustained noise will be higher than the ambient noise and so will initially be flagged as an impulse. However, as the ambient noise continues, the ambient noise signal will quickly increase to the level of the detection signal, meaning that the comparison of the two signals will only briefly exceed the threshold condition. The time constant of the ANR filters is typically such that the delay will likely not be noticeable to a user.

To further improve the performance of impulse detection, each sample that exceeds the threshold can be zeroed out or otherwise conditioned so that the detected impulse does not impact the ambient noise signal 406. In other words, during the delay implemented by delay unit 414, the detected energy of the impulse can be removed so that the detected impulse does not affect the background noise measurement for future samples.

Figures 5A, 5B, 5C:
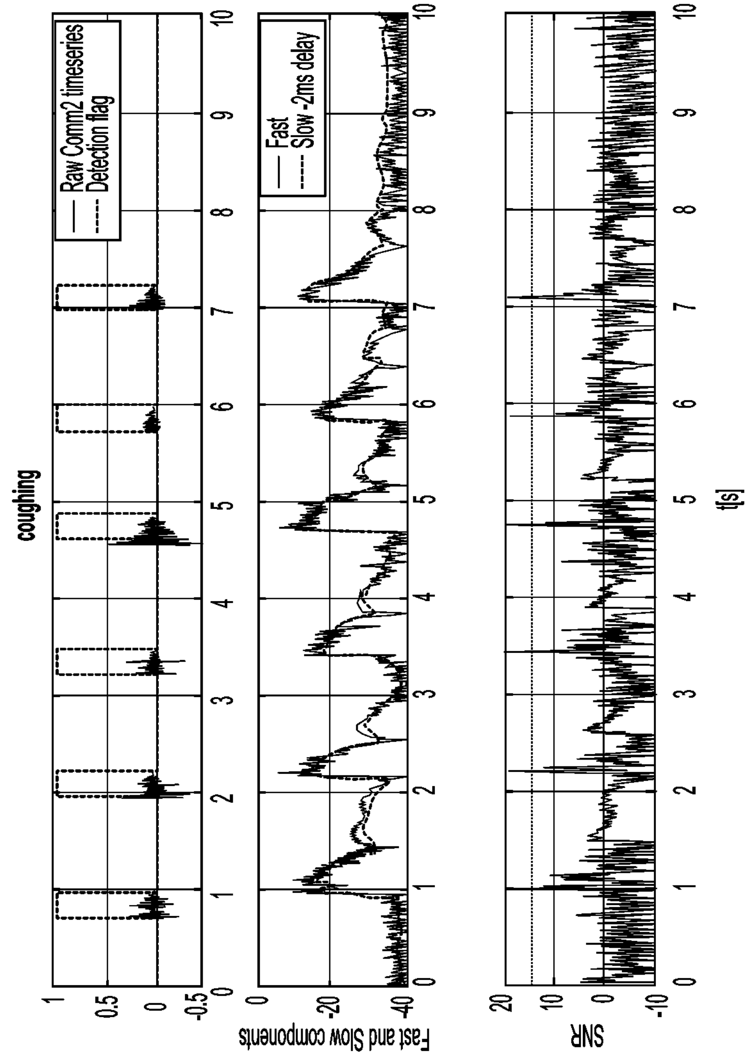
FIG. 5A is a plot of an acoustic signal of coughing and the resulting impulse detection flag.
FIG. 5B is a plot of a detection signal and an ambient noise signal resulting from the acoustic signal of coughing.
FIG. 5C is a plot of the signal to noise ratio of the detection signal and an ambient noise signal resulting from the acoustic signal of coughing and the impulse detection threshold.

To demonstrate the operation of impulse detection, FIGS. 5-7 depict various recorded audio signals, the outputs detection signal 408 and ambient noise signal 406, and the calculated signal-to-noise ratio between the two. FIG. 5A depicts the input audio signal of a person coughing at fairly regular intervals (roughly one second apart). FIG. 5B depicts detection signal 408 and ambient noise signal 406, which has been delayed 2 ms. As shown, because ambient noise signal 406 employs a larger amount of smoothing, the sharp peaks of the input signal are not captured. Further, to the extent that the peaks of the input signal are captured, they are delayed by 2 ms so that the discrepancy between the captured peaks in the detection signal 408 are compared to the ambient noise as it existed before the onset of the cough. As a result, as shown in FIG. 5C, the peak at the onset of the cough is sufficient to create a large difference between the detection signal 408 and the ambient noise signal 406, thus triggering the detection flag (shown in FIG. 5A) and suppressing the ANR response. It should be noted that, in this example, the detection flag is held high for a predetermined period of time after the SNR exceeds the 15 dB threshold in order to ensure that the full duration of the ANR response to the impulse.

Figures 6A, 6B, 6C:
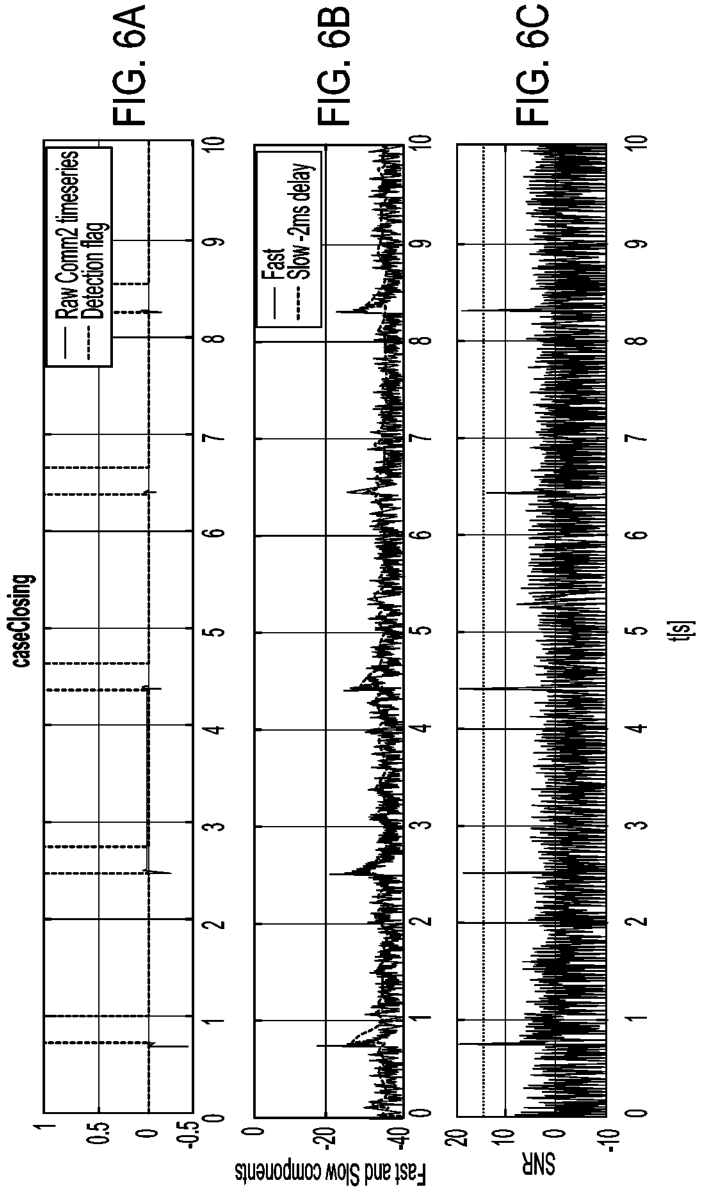
FIG. 6A is a plot of an acoustic signal of a case closing and the resulting impulse detection flag.
FIG. 6B is a plot of a detection signal and an ambient noise signal resulting from the case closing signal of coughing.
FIG. 6C is a plot of the signal to noise ratio of the detection signal and an ambient noise signal resulting from the acoustic signal of the case closing and the impulse detection threshold.

In a similar manner, FIG. 6A-6C depict the output of feedforward microphone 102 to the periodic closing of a case. FIG. 6B shows the detection signal 408 and the ambient noise signal 406 resulting from this signal, which, like the cough signal of FIG. 5A, results in an initial peak in detection signal, sufficient to generate an SNR in FIG. 6C that exceeds the predetermined threshold and sets a flag to suppress the ANR response.

Figures 7A, 7B, 7C:
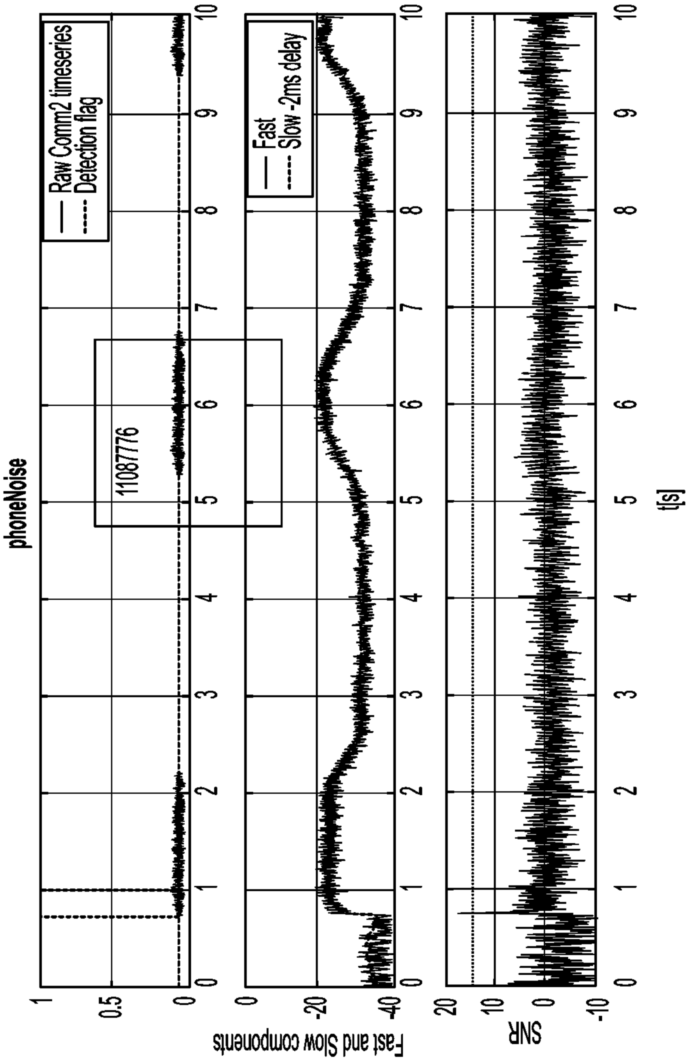
FIG. 7A is a plot of an acoustic signal of pink noise and the resulting impulse detection flag.
FIG. 7B is a plot of a detection signal and an ambient noise signal resulting from the acoustic signal of pink noise.
FIG. 7C is a plot of the signal to noise ratio of the detection signal and an ambient noise signal resulting from the acoustic signal of pink noise and the impulse detection threshold.

By contrast, FIG. 7A depicts the audio signal resulting from a phone that began playing pink noise at approximately the 0.75 second mark and then was waved back and forth near feedforward microphone 102. As shown, at the initial onset of the pink noise audio signal, a spike in the detection signal 408 relative to the ambient noise signal 406 (FIG. 7B) registers, in FIG. 7C, an SNR that triggers the suppression of the ANR response. Afterward, however, the change in the audio signal resulting from waving the phone back and forth does not create a sufficiently large difference between the detection signal 408 and the ambient noise signal 406 to exceed the SNR threshold. This demonstrates that while the initial onset of a new sustained ambient noise will trigger and briefly delay the ANR response, the ambient noise signal 406 quickly adapts, allowing the ANR response to reduce the ambient noise as desired.

The ANR suppression can occur in any number of ways of suitable ways and will be dependent, in part, on the implementation of the ANR/pass-through system. In one example, an interrupt signal can be generated that temporarily freezes the adjustment VGA 320, so that the ANR response is held constant until the period during which an adjustment resulting from the impulse would have occurred, passes. Alternatively, the response time of VGA 320 associated with the signal pathway, for example, as described with reference to FIG. 3A, can be adjusted. The response rate of VGA 320 can be changed so that the ANR is adjusted relatively gradually in response to the sample under test, making the change in ANR less noticeable or not noticeable to a user. It should be understood that, for the purposes of this disclosure, to suppress the ANR response means to diminish the ANR response with respect to how it would have occurred during normal operation (i.e., without any intervention from the impulse detection) in response to the impulse. Thus, holding ANR response constant once the impulse is detected, or slowing the response to the impulse, are both considered "suppressing" the ANR response.

Depending on the topology of the ANR system, suppressing the ANR response could entail adjusting or holding constant a VGA that is at the input or output of the ANR filter. Further, adjustments to the ANR filter itself can be made, such as adjusting its rate of adaptation so that it does not adapt, or adapts very slowly, to the incoming impulse. Other suitable methods of suppressing the ANR response, such as filtering an input sample from the ANR filter input, are conceivable and within the scope of this disclosure.

Further, in alternative examples, rather than suppressing the entire ANR response, the ANR response could be adjusted to mitigate the effects of overloading the transducer 106 in response to a large input signal. Large input signals cause the microphone to clip, which introduce noise transients into the voltage signal applied to the transducer. Large inputs also tend to result in a large ANR response that overloads the transducer 106. Overloading the transducer 106 can be mitigated by reducing the ANR filter gain in certain portions of frequency range (e.g., very high or low frequencies). Other measures of mitigating transducer overload are conceivable and, like the example of suppressing the ANR output, dependent, in part, on the topology of ANR/pass-through system.

The impulse detection described in this disclosure can be further employed to control the operation of a device such as headset 100. For example, the digital signal processor could be further programmed to monitor the impulse detection flags for sets of impulses that correspond to preset user inputs. As an example, the digital signal processor could be programmed to consider two separate impulses, approximately a half second apart, as a user command to pause track, to skip to the next track, etc. This is simply provided as an example of the kind of impulses that could be regarded as a user command. Generally, it would be beneficial to select impulses that would be easy to generate by a user, by e.g., clicking the user's tongue, and which would be unlikely to occur outside of deliberate commands.

Figure 8:
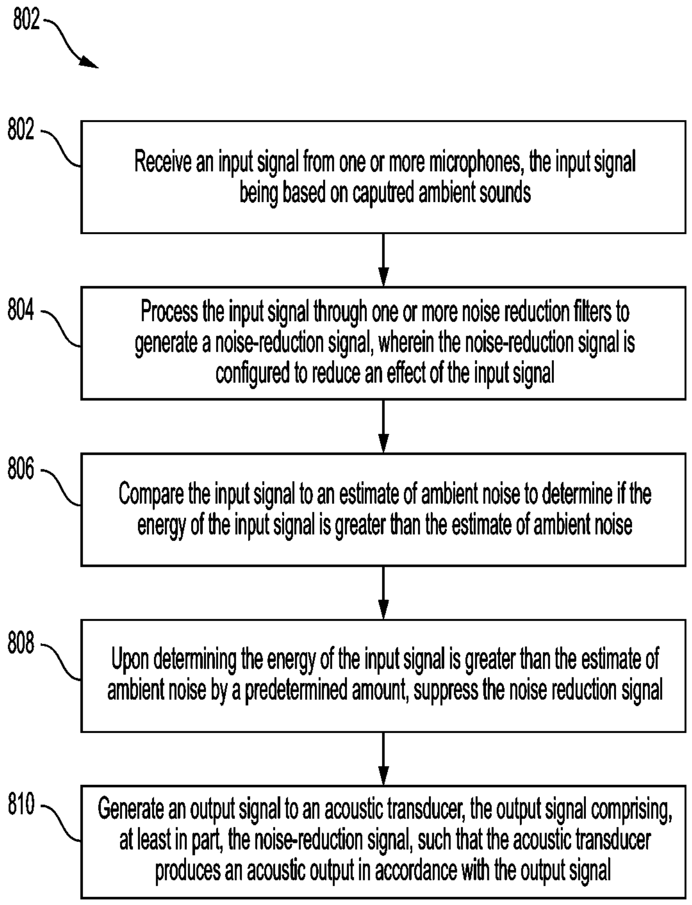
FIG. 8 is a flowchart of an example process for suppressing a noise-reduction signal output from one or more noise-reduction filters in response to impulsive acoustic inputs to a microphone, such as a feedforward microphone.

FIG. 8 is a flowchart of an example process 800 for suppressing a noise-reduction signal output from one or more noise-reduction filters in response to impulsive acoustic inputs to a microphone, such as a feedforward microphone.

At least a portion of the process 800 can be implemented using one or more processing devices such as DSPs described in U.S. Pat. Nos. 8,073,150 and 8,073,151, incorporated herein by reference in their entirety. In some implementations, the process 800 can be implemented in a device that includes signal paths substantially similar to those depicted in FIGS. 3-4.

At step 802, an input signal is received from one or more microphones, based on captured ambient sounds. The microphones can be, for example, feedforward microphones, such as feedforward microphone 102. At step 804, the input signal is processed through one or more noise reduction filters (e.g., an ANR filter) to generate a noise-reduction signal, the noise-reduction signal being configured to reduce an effect of the input signal.

At step 806, the input signal is compared to an estimate of ambient noise to determine if the energy of the input signal is greater than the estimate of ambient noise. The estimate of ambient noise can be estimated in a variety of ways. For example, a buffer of samples can be stored and the values of each averaged or an exponential moving average can employed to average the current sample with a weighted average of previous examples. Alternatively, the input signal can be transformed to the frequency domain and the power of the bins or a subset of bins averaged to determined an ambient noise estimate. In yet another example, a low pass filter, such as shown in FIGS. 4A and 4B can be used to smooth the input signal and form and estimate of the ambient noise.

The energy of the input signal (which can itself be output from a low pass filter, such as shown in FIGS. 4A and 4B) can be compared against the estimate of the ambient energy by finding, for example, the difference or the ratio of the energy of the input signal and the estimated ambient energy.

At step 808, upon determining that the energy of the input signal is greater than the estimate of ambient noise by a predetermined amount, noise reduction signal is suppressed. The result of the comparison in step 806 can be compared to a threshold value to determine if it is indicative of an impulse (or, at the minimum, the onset of sustained noise). If the comparison exceeds the threshold, an action can be taken to suppress the noise-reduction signal.

The ANR suppression can occur in any number of ways of suitable ways and will be dependent, in part, on the implementation of the ANR/pass-through system. In the example of FIGS. 3-4, an interrupt signal can be generated that temporarily freezes the adjustment of a variable gain amplifier, so that the ANR response is held constant until the period during which an adjustment resulting from the impulse would have occurred, passes. Alternatively, the response time of a VGA 320 associated with the signal pathway, for example, as described with reference to FIG. 3A, can be adjusted. The response rate of VGA 320 can be changed so that the ANR is adjusted relatively gradually in response to the sample under test, making the change in ANR less noticeable or not noticeable to a user.

Further, depending on the topology of the ANR system, suppressing the ANR response could also entail adjusting or holding constant a VGA that is at the input or output of the ANR filter. Further, adjustments to the ANR filter itself can be made, such as adjusting its rate of adaptation so that it does not adapt to the incoming impulse. Other suitable methods of suppressing the ANR response, such as filtering an input sample from the ANR filter input, are conceivable and within the scope of this disclosure.

At step 810, an output signal is generated to an acoustic transducer, the output signal comprising, at least in part, the noise-reduction signal, such that the acoustic transducer produces an acoustic output in accordance with the output signal.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

The invention claimed is:

1. An apparatus comprising:

A noise reduction headphone comprising one or more microphones and an acoustic transducer, the one or more microphones configured to generate an input signal based on captured ambient sounds; and a controller comprising one or more processing devices, the controller configured to:

process the input signal through one or more noise reduction filters to generate a noise-reduction signal, wherein the noise-reduction signal is configured to reduce an effect of the input signal;

compare the input signal to an estimate of ambient noise to determine if an energy of the input signal is greater than the estimate of ambient noise, wherein if the energy of the input signal is greater than the estimate of ambient noise by a predetermined amount, a change in the noise-reduction signal is suppressed; and generate an output signal, the output signal comprising, at least in part, the noise-reduction signal, wherein the acoustic transducer is configured to produce an acoustic output in accordance with the output signal.

2. The apparatus of claim 1, wherein the output signal is a weighted combination of the noise-reduction signal and a pass-through signal.

3. The apparatus of claim 1, wherein comparing the input signal to an estimate of ambient noise comprises comparing an energy of the input signal to an ambient noise signal produced by a first low pass filter, wherein the first low pass filter is configured such that the ambient noise signal is an estimate of the ambient noise present in the captured ambient sounds.

4. The apparatus of claim 1, wherein the ambient noise signal is delayed in time with respect to the input signal.

5. The apparatus of claim 3, wherein the energy of the input signal is determined by the output of a second low pass filter, wherein the second low pass filter affects greater smoothing on the input signal than the first low pass filter.

6. The apparatus of claim 5, wherein comparing the energy of the input signal further comprises determining whether a difference between the output of the second low pass filter and the ambient noise signal satisfies a threshold condition.

7. The apparatus of claim 5, wherein comparing the energy of the input signal further comprises determining whether a ratio between the output of the second low pass filter and the ambient noise signal satisfies a threshold condition.

8. The apparatus of claim 1, wherein suppressing the noise reduction signal comprises temporarily ceasing to increase a magnitude of the noise reduction signal.

9. The apparatus of claim 8, wherein temporarily ceasing to increase a magnitude of the noise reduction signal comprises temporarily ceasing to adjust a variable gain filter in a pass-through processing chain generating a pass-through signal, wherein the output signal is a weighted combination of the noise-reduction signal and the pass-through signal.

10. The apparatus of claim 1, wherein suppressing the noise reduction signal comprises adjusting a rate at which the noise reduction signal is adjusted in response to the input signal.

11. One or more non-transitory machine-readable storage devices having encoded thereon computer readable instructions for causing one or more processing devices to perform a method comprising the steps:

receiving an input signal from one or more microphones, the input signal being based on captured ambient sounds;

processing the input signal through one or more noise reduction filters to generate a noise-reduction signal, wherein the noise-reduction signal is configured to reduce an effect of the input signal;

comparing the input signal to an estimate of ambient noise to determine if an energy of the input signal is greater than the estimate of ambient noise, wherein if the energy of the input signal is greater than the estimate of ambient noise by a predetermined amount, suppressing a change in the noise reduction signal; and generating an output signal to an acoustic transducer, the output signal comprising, at least in part, the noise-reduction signal, such that the acoustic transducer produces an acoustic output in accordance with the output signal.

12. The one or more non-transitory machine-readable storage devices of claim 11, wherein the output signal is a weighted combination of the noise-reduction signal and a pass-through signal.

13. The one or more non-transitory machine-readable storage devices of claim 11, wherein comparing the input signal to an estimate of ambient noise comprises comparing an energy of the input signal to an ambient noise signal produced by a first low pass filter, wherein the first low pass filter is configured such that the ambient noise signal is an estimate of the ambient noise present in the captured ambient sounds.

14. The one or more non-transitory machine-readable storage devices of claim 11, wherein the ambient noise signal is delayed in time with respect to the input signal.

15. The one or more non-transitory machine-readable storage devices of claim 13, wherein the energy of the input signal is determined by the output of a second low pass filter, wherein the second low pass filter affects greater smoothing on the input signal than the first low pass filter.

16. The one or more non-transitory machine-readable storage devices of claim 15, wherein comparing the energy of the input signal further comprises determining whether a difference between the output of the second low pass filter and the ambient noise signal satisfies a threshold condition.

17. The one or more non-transitory machine-readable storage devices of claim 15, wherein comparing the energy of the input signal further comprises determining whether a ratio between the output of the second low pass filter and the ambient noise signal satisfies a threshold condition.

18. The one or more non-transitory machine-readable storage devices of claim 15, wherein suppressing the noise reduction signal comprises temporarily ceasing to increase a magnitude of the noise reduction signal.

19. The one or more non-transitory machine-readable storage devices of claim 18, wherein temporarily ceasing to increase a magnitude of the noise reduction signal comprises temporarily ceasing to adjust a variable gain filter in a pass-through processing chain generating a pass-through signal, wherein the output signal is a weighted combination of the noise-reduction signal and the pass-through signal.

20. The one or more non-transitory machine-readable storage devices of claim 11, wherein suppressing the noise reduction signal comprises adjusting a rate at which the noise reduction signal is adjusted in response to the input signal.

21. A method comprising:

receiving an input signal representing audio captured by a microphone of an active noise reduction (ANR) headphone;

processing, by one or more processing devices, a portion of the input signal to determine a noise level in the input signal;

determining that the noise level satisfies a first threshold condition;

comparing the input signal to an estimate of ambient noise to determine if an energy of the input signal is greater than that of the estimate of ambient noise by a predetermined amount, responsive to determining that the noise level satisfies the first threshold condition and that the energy of the input signal is not greater than that of the estimate of the ambient noise by the predetermined amount, generating an output signal in which ANR processing on the input signal is automatically controlled to limit a loudness level of the output signal;

responsive to determining that the energy of the input signal is greater than the estimate of the ambient noise by the predetermined amount, generating an output signal in which ANR processing on the input signal is not automatically controlled to limit the loudness level of the output signal; and driving an acoustic transducer of the ANR headphone using the output signal.

22. The method of claim 21, wherein the step of generating an output signal in which ANR processing on the input signal is automatically controlled to limit a loudness level of the output signal comprises:

generating an output signal in which ANR processing on the input signal is automatically controlled to limit the loudness level of the output signal to a level lower than or substantially equal to a predefined target loudness level of the output signal.

23. The method of claim 22, wherein the predefined target loudness level is a sound pressure level at an ear of a user of the ANR headphone.

* * * * *